F. T. McDONOUGH.
TAIL GUIDE FOR BAND SAWS.
APPLICATION FILED FEB. 21, 1908.
936,251.
Patented Oct. 5, 1909.
3 SHEETS—SHEET 3.
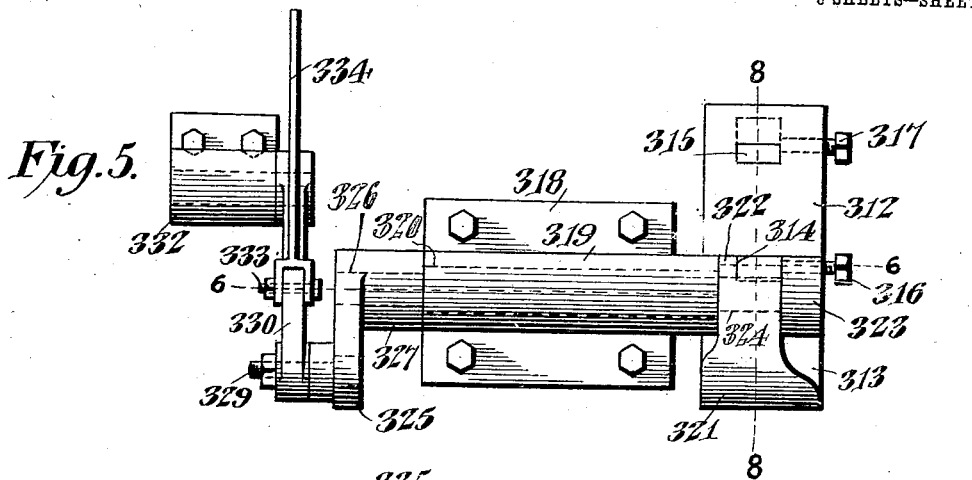
Fig. 5.
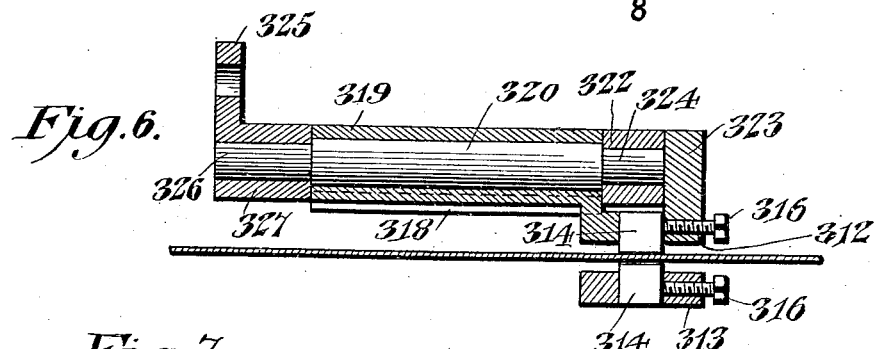
Fig. 6.
Fig. 7.
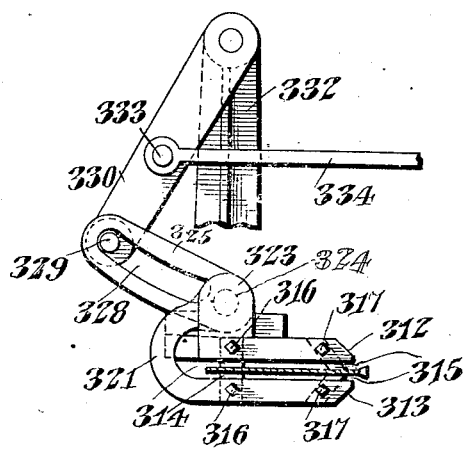
Fig. 8.
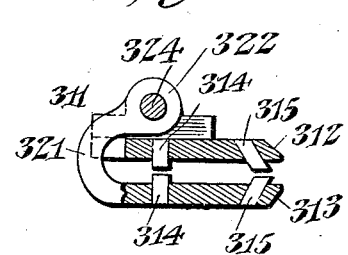
Witnesses
Jas. H. McCathran
H. H. Riley
Francis T. McDonough, Inventor
By E. G. Siggers
Attorney

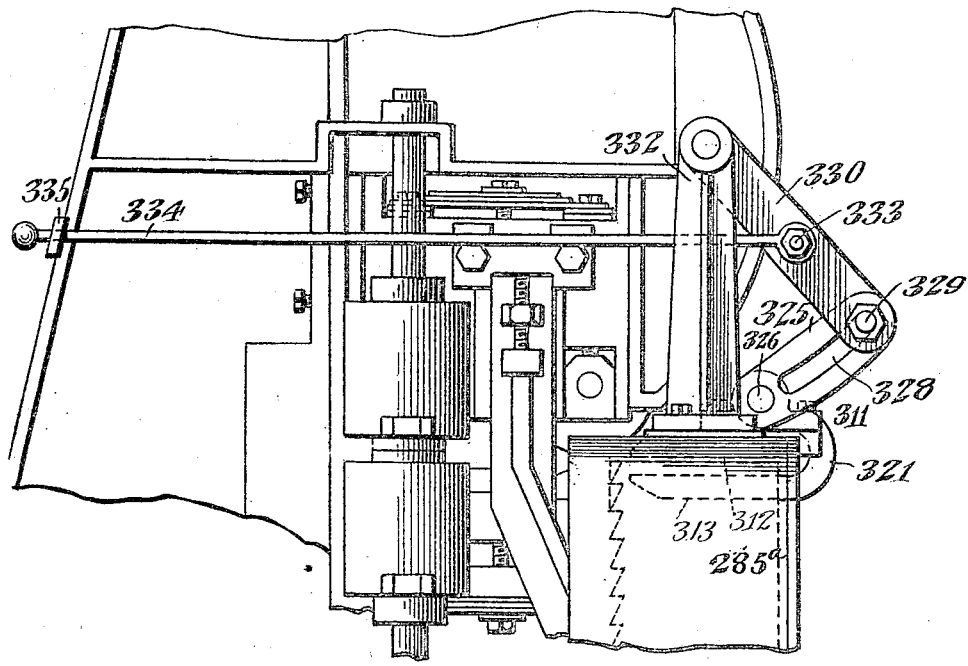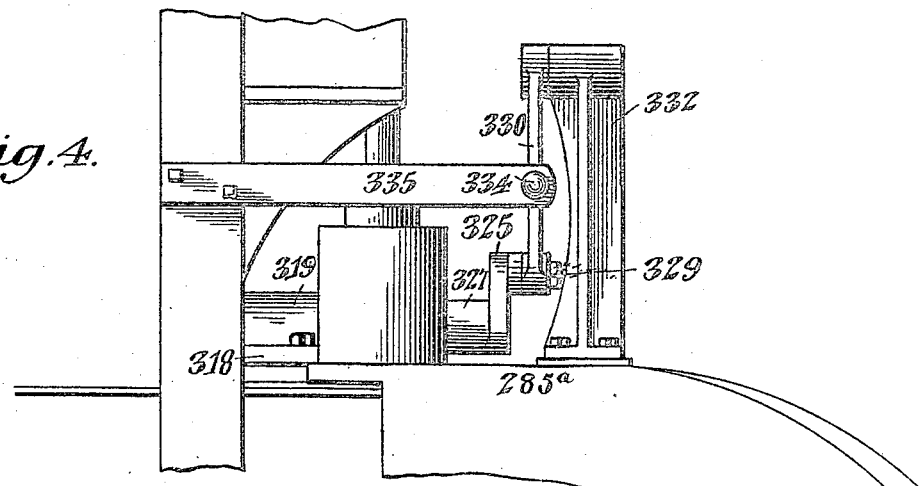

UNITED STATES PATENT OFFICE.

FRANCIS THOMAS McDONOUGH, OF EAU CLAIRE, WISCONSIN.

TAIL-GUIDE FOR BAND-SAWS.

936,251.   Specification of Letters Patent.   Patented Oct. 5, 1909.

Original application filed March 20, 1907, Serial No. 363,526. Divided and this application filed February 21, 1908. Serial No. 417,110.

*To all whom it may concern:*

Be it known that I, FRANCIS T. McDONOUGH, a citizen of the United States, residing at Eau Claire, in the county of Eau Claire and State of Wisconsin, have invented a new and useful Tail-Guide for Band-Saws, of which the following is a specification.

This application is a division of the application filed by me Mar. 20, 1907, Serial No. 363,526, for an improvement in horizontal band resawing machines, and the invention relates to a tail guide.

The object of the present invention is to improve the construction of tail guides for band saw wheels, and to provide a simple and comparatively inexpensive one, adapted to be opened and closed from the front of the machine to relieve the band saw should the tail guide become clogged by a sliver or splinter of wood.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
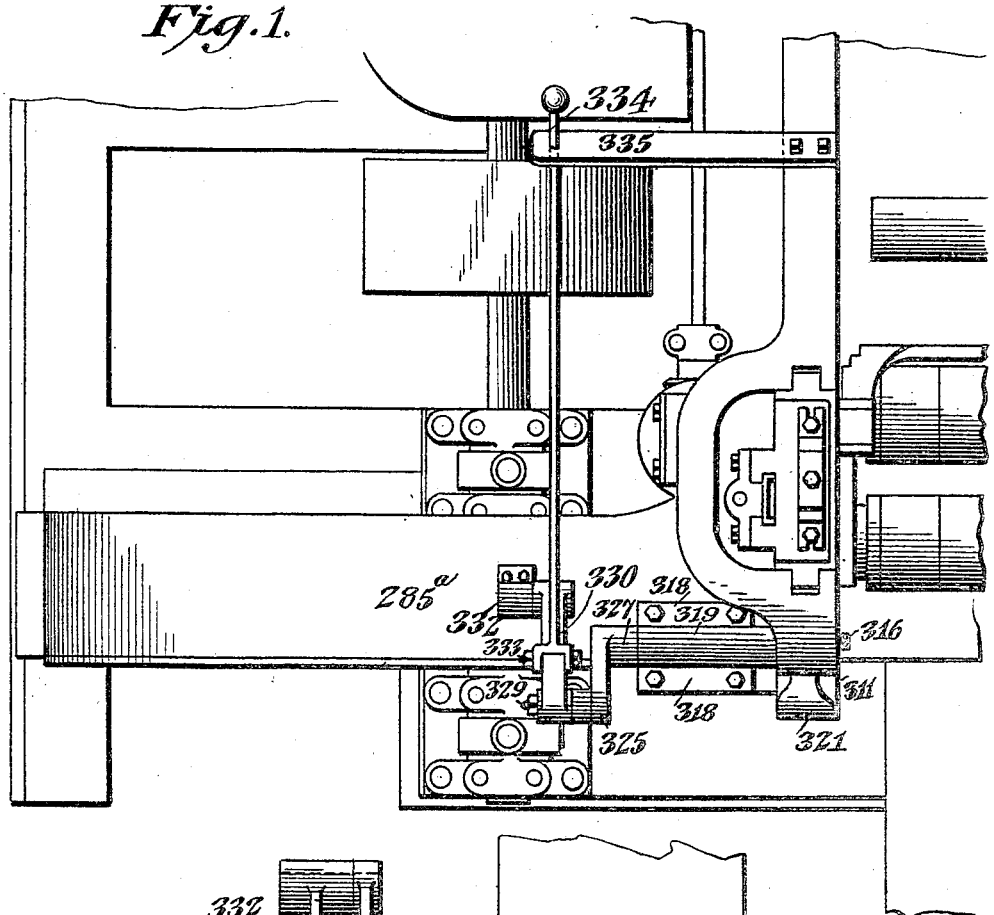
Figure 2:
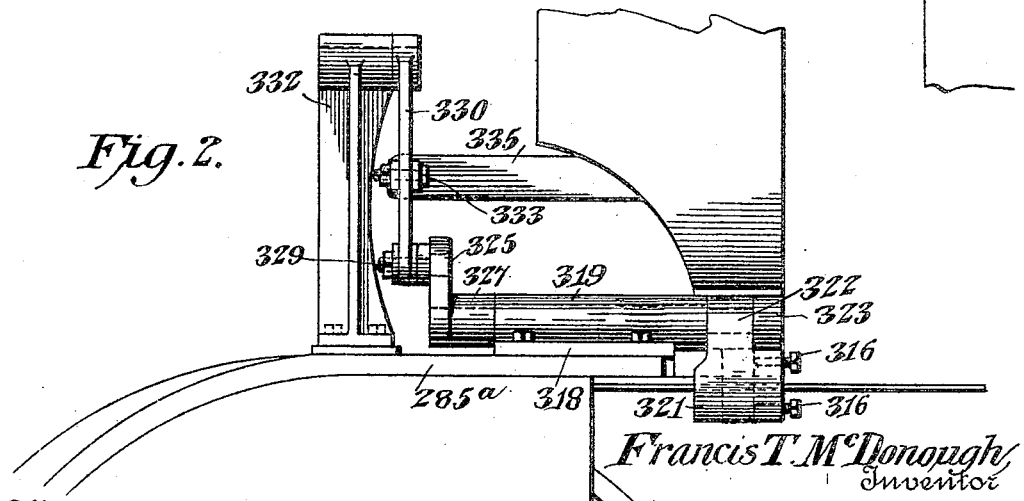

In the drawings:—Figure 1 is a plan view of a portion of a horizontal band resawing machine, provided with a tail guide, constructed in accordance with this invention. Fig. 2 is a rear elevation of the same. Fig. 3 is a side elevation. Fig. 4 is a front elevation. Fig. 5 is an enlarged detail plan view of the tail band saw guide. Fig. 6 is an enlarged detail sectional view, taken substantially on the line 6—6 of Fig. 5. Fig. 7 is an enlarged detail side view of the tail guide. Fig. 8 is a detail sectional view, taken substantially on the line 8—8 of Fig. 5.

Like numerals of reference designate corresponding parts in all the figures of the drawings.

The band saw guard 285ᵃ has mounted on it a relatively stationary or non-adjustable tail band saw guide 311, composed of upper and lower members 312 and 313, which are adapted to be opened and closed to relieve the band saw, should the tail guide become clogged with a sliver, or the like. The upper and lower members are provided with adjustable pegs 314 and 315, which are secured in their adjustment by means of set screws 316 and 317. The upper member 312 is formed integral with a bracket or plate 318, or otherwise secured to the guard 285ᵃ and provided with a sleeve or bearing 319 for a rock shaft 320. The bracket or plate 318 is arranged upon the top of the saw guard, and the upper member of the saw guide extends beyond the saw guard in a direction in line with the saw.

The lower member is provided at the top with an upwardly extending approximately semi-circular arm 321, terminating at its upper end into an eye 322, through which the inner end of the rock shaft or pivot 320 extends. The curved arm pivotally suspends the lower member of the saw guide at a point beyond the saw guard, and it permits the lower member to swing downwardly away from the horizontal band saw in a direction transversely of the same. The eye 322 fits between the inner end of the sleeve or bearing 319 and an upwardly extending lug 323 of the upper member 312. The lug 323, which is arranged in spaced relation to the inner end of the sleeve or bearing 319, forms a solid abutment for the inner end 324 of the shaft or pivot 320.

An upwardly extending inclined arm 325 is mounted on the outer end 326 of the shaft or pivot 320, which has its ends reduced, as shown, to fit the eye 322 of the lower member and a sleeve or laterally enlarged eye 327 of the arm 325. The arm is provided with a slightly curved slot 328, which receives a projecting pin or stud 329 of an oscillatory lever 330, and the latter is pivoted at its upper end to a standard or support 332, and is adapted to be swung forwardly from the position illustrated in Fig. 7 of the drawings to open the tail band saw guide. When the lever 330 is swung forwardly, the lower member of the tail band saw guide is swung downwardly, which will relieve the band saw, should the tail band saw guide become clogged by a sliver or splinter of wood. As the lower member swings downwardly gravity will assist the movement and also the clearing of the saw guide, as any accumulation will readily fall out of the guide when the lower member is swung downward.

The standard or support 332, which extends upwardly from the top of the wheel guard 285ª, is provided at its bottom with flanges forming a base, which is bolted, or otherwise secured to the wheel guard 285ª. The lever 330 is connected at an intermediate point by a pivot 333 to the rear end of an operating rod 334, which extends to the front of the machine. The operating rod, which is provided at its front end with a suitable grip or handle, is guided in an opening of a horizontal arm 335. The operating rod will enable the tail saw guide to be opened and closed by the operator without leaving his position at the front of the machine.

Having thus fully described my invention, what I claim as new and desire to secure by Letters Patent, is:—

1. In a sawing machine, the combination with a horizontal band saw, of a band saw guide including upper and lower members located, respectively, above and below the horizontal band saw, the upper member maintaining a fixed position at all times with relation to the saw and the lower member being hinged to and arranged to swing downwardly from the lower face of the saw to clear the saw guide, and operating means connected with the lower member for swinging the same toward and from the saw.

2. In a sawing machine, the combination with a horizontal band saw, of a band saw guide including upper and lower members located, respectively, above and below the horizontal band saw, the lower member being hinged and arranged to swing downwardly away from the saw in a direction transversely thereof to clear the saw guide, and operating means connected with the lower member for swinging the same toward and from the saw and constituting the sole means for retaining the lower member in coöperative relation with the saw.

3. In a sawing machine, the combination with a horizontal band saw, of a band saw guide including upper and lower members located, respectively, above and below the band saw, the upper member maintaining a fixed position at all times with relation to the saw, and the lower member being provided with a curved arm extending upwardly around the back of the band saw and pivoted to the upper member to permit the lower member to swing downwardly from the lower face of the band saw, and operating means connected with the curved arm for swinging the lower member to and from the saw.

4. In a sawing machine, the combination with a horizontal band saw, of a saw guide composed of upper and lower guiding members located, respectively, above and below the horizontal band saw, the upper member maintaining a fixed position at all times with relation to the saw and the lower guiding member being provided with an arm hinged to the upper guiding member and permitting the lower guiding member to swing downwardly from the lower face of the band saw should the guide become clogged, and operating means connected with the said arm for swinging the lower member toward and from the saw.

5. In a sawing machine, the combination with a horizontal band saw, of a band saw guide composed of an upper member maintaining a fixed position at all times with relation to the saw, and a hinged lower member provided with a rigidly connected slotted arm and arranged to swing downwardly from the lower face of the band saw, an oscillatory lever having means operating in the slot to swing the arm for opening and closing the band saw guide, and operating means for the lever.

6. In a sawing machine, the combination with a horizontal band saw, and a saw guard, of a band saw guide mounted upon the top of the saw guard and supported wholly thereby and extending beyond the said saw guard in a direction in line with the saw and receiving the latter.

7. In a sawing machine, the combination with a horizontal band saw, and a saw guard, of a band saw guide mounted upon the top of the saw guard and supported wholly thereby and extending beyond the saw guard in a direction in line with the saw and provided with a hinged lower member arranged to swing downwardly from the lower face of the saw to open the saw guide and relieve the saw should the guide become clogged, and means also mounted upon the top of the saw guard and connected with the hinged member for oscillating the same.

8. In a sawing machine, the combination with a horizontal band saw, and a saw guard, of a saw guide including an upper member provided with a bracket secured upon the top of the saw guard, said upper member being extended beyond the saw guard in a direction in line with the band saw and supported by the said bracket, and a lower member hinged to the upper member and supported by the same at a point beyond the saw guard and arranged to swing downwardly from the lower face of the band saw.

9. In a sawing machine, the combination with a horizontal band saw, and a saw guard, of a saw guide including an upper member provided with a bracket secured upon the top of the saw guard, said upper member being extended beyond the guard in a direction in line with the saw, and a lower member hinged to the upper member at a point beyond the saw guard and provided with an arm, a standard also mounted upon the top of the saw guard and located at a point beyond the bracket, an inclined oscillatory lever pivoted at its upper end to the standard and connected at its lower end with the arm of the lower member, and operating mechanism for swinging the said lever to open and close the saw guide.

10. In a sawing machine, the combination with a horizontal band saw, and a saw guard, of a saw guide including an upper member provided with a bracket secured upon the top of the saw guard, said upper member being extended beyond the guard in a direction in line with the saw, and a lower member hinged to the upper member at a point beyond the saw guard and provided with an arm located at the inner side of the bracket having a longitudinal slot, a standard mounted upon the top of the saw guard and located at a point beyond the bracket, an inclined oscillatory lever pivoted at its upper end to the standard and provided at its lower end with connecting means operating in the slot of the arm of the lower member, and operating mechanism for swinging the said lever to open and close the saw guide.

In testimony, that I claim the foregoing as my own, I have hereto affixed my signature in the presence of two witnesses.

FRANCIS THOMAS McDONOUGH.

Witnesses:
B. HOGAN,
E. A. ARNOLD.